Patented Feb. 16, 1926.

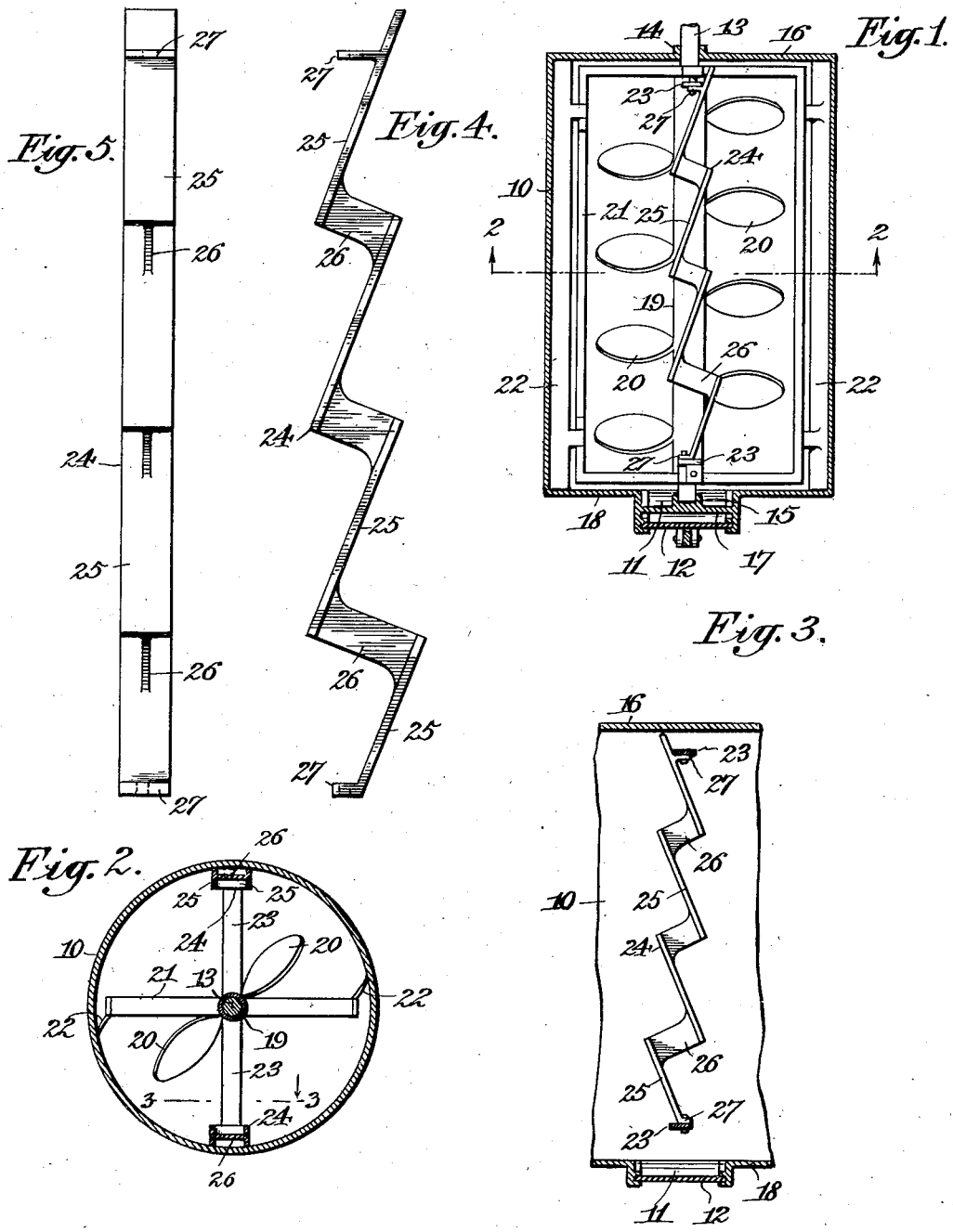

1,573,658

UNITED STATES PATENT OFFICE.

EMERY THOMPSON, OF NEW ROCHELLE, NEW YORK.

MIXING AND EJECTING MECHANISM.

Application filed May 29, 1925. Serial No. 33,744.

*To all whom it may concern:*

Be it known that I, EMERY THOMPSON, a citizen of the United States, and a resident of New Rochelle, in the county of Westchester and State of New York, United States of America, have invented a new and Improved Mixing and Ejecting Mechanism, of which the following is a full, clear, and exact description.

This invention relates to the class of mechanisms for mixing or constantly agitating the contents of a container such as a horizontally disposed cylinder having a gate at one end and for rapidly ejecting the contents of the cylinder when the gate is opened.

An object of the present invention is to improve mechanisms of the character mentioned by incorporating therein a novel form of mixer and ejector which serves to quicken the mixing action, and which also serves as a means for ejecting a mixture from a cylinder or the like also forming a part of the mechanism.

Another object of the present invention is the production of means especially adapted for use in conjunction with a horizontally disposed refrigerator cylinder for throwing or pitching the contents of the cylinder in opposite directions with respect to the longitudinal axis of the cylinder with a swirling effect, and to keep the contents of the cylinder constantly spread out with an even thickness on the walls of the cylinder to thereby quicken the freezing time.

With the foregoing and other objects in view the invention resides in the particular provision, construction and relative disposition of the parts hereinafter fully described and illustrated in the accompanying drawing, in which—

Figure 1 is a longitudinal sectional view through a cylinder in which the mixing and ejecting mechanism of the present invention is operatively arranged, the same being shown in elevation.

Fig. 2 is a transverse sectional view taken on the line 2—2 of Fig. 1 looking in the direction indicated by the arrows.

Fig. 3 is a longitudinal sectional view taken substantially in the plane indicated by the line 3—3 of Fig. 2 and looking in the direction indicated by the arrows.

Fig. 4 is a plan view of the type of mixing and agitating element.

Fig. 5 is a side elevation of the mixing and ejecting element shown in Fig. 4.

In the present instance the mixing and ejecting mechanism is intended to be used for mixing or agitating the mixture or contents of a horizontally disposed refrigerated cylinder of an ice cream freezer, and for ejecting the mixture or contents at a particular time when the gate of said cylinder is opened.

When the mixture or contents of an ice cream freezer is sufficiently refrigerated, it is imperative that it should be discharged quickly from the cylinder which holds it in order that there may be a uniformity of solidity in the finished ice cream, because if the partly refrigerated contents is not discharged quickly, part of the same is likely to be soft, and the other part is apt to be hard, in which event there would not only be a loss of bulk, but a difference in weight and texture of the finished product.

Therefore to meet all of the above mentioned exigencies, the mechanism presently to be described is provided. The said mechanism will include a cylinder which forms a part of an ice cream freezer, and the said cylinder has an opening 11 in the front end thereof which is controlled by a gate 12. The said cylinder 10 receives a mixture from which ice cream is produced, and the said cylinder walls are kept cold by suitable refrigerating means, not shown. A driven shaft 13 is disposed centrally and longitudinally of the cylinder 10 and is mounted for rotation in bearings 14 and 15 respectively supported by the rear end wall 16 and a bracket 17 arranged adjacent the front end wall 18 to which it is attached. A spaddle 19 is mounted on a shaft 13 and includes blades 20 which are disposed in a manner to throw or pitch the contents of the cylinder toward the rear end wall 16 in the rotation of the spaddle. A frame 21 is carried by the hub of the spaddle 19 and supports scraper blades 22 which keep the side wall of the cylinder 10 free from any of the mixture in the cylinder which might adhere thereto. Pairs of arms 23 extend radially from the hub of the spaddle 19. One pair of arms 23 is disposed diametrically opposite the other pair of arms. Each pair of arms has attached thereto a mixing and ejecting element 24. Each of the elements 24 comprises a plurality of blades 25 which are connected together by bridge pieces 26, and attaching means in the form of end lugs 27 having apertures therein to serve for the attachment of the element to the arms 23. The blades 25 are disposed in parallelism with respect to each other, and said blades will be disposed at an angle with respect to the longitudinal axis of the cylinder 10 when the elements are attached. It is to be noted that the elements 24 are arranged outside of the spaddle blades 20 in close proximity to the side wall of the cylinder 10 as shown most clearly in Fig. 2. By virtue of the relative disposition of the blades 25 with respect to each other it is possible to get a maximum throwing or pitching surface in a minimum of space in the cylinder, and at points where the elements will be most effective for coacting with the spaddle 19 in the mixing operation. It is also to be noted that the blades 25 are so pitched or disposed that they will throw or pitch the contents of the cylinder toward the front end wall 18 and therefore in a direction opposite to that in which the blades 20 of the spaddle throw or pitch the contents. It is also to be noted that by connecting the blades 25 together in the manner shown in which the bridge pieces 26 are arranged between the adjacent blades, instead of using a single bar for supporting all of the blades, it is possible to obtain a maximum amount of pitching surface in each of the mixing and ejecting elements 24, and which permits of the use of comparatively large spaddle blades because of the obviation of the use of a supporting bar.

In the operation with a certain amount of material in the cylinder 10 to be thoroughly mixed and frozen, and with the gate 12 closed, the blades 20 of the spaddle throw or pitch the material toward the rear end wall 16 whereas the elements 24 serve to bring the material in an opposite direction toward the front end wall 18, while the scraper blades 22 prevent the material from adhering to the side wall of the cylinder. The material is therefore evenly distributed and spread out in a manner which will result in the material being fully expanded and readily susceptible to the refrigerating effect produced by the cold cylinder walls. When the gate 12 is opened, the blades 25 of the elements 24 serve to bring the partly congealed contents of the cylinder toward the front end wall 18 and thereby rapidly ejects the same through the opening 11. It will therefore be understood that the elements 24 not only serve in the mixing operation but also serve effectively for ejecting the contents of the cylinder through the opening 11.

I claim:

1. A mixing and ejecting element comprising a plurality of blades, means for effecting the attachment of the blades consisting of apertured lugs, the apertures in said lugs being in axial alignment, said blades being disposed in parallelism with respect to each other and in spaced relationship, and the said blades being connected together by portions arranged respectively between adjacent blades.

2. The combination with a cylinder of an ice cream freezer, of a rotor within said cylinder, and mixing and ejecting elements carried by said rotor, each of said elements consisting of a series of blades movable in close proximity to the wall of said cylinder, said blades being arranged substantially in parallelism at an angle with respect to the longitudinal axis of said cylinder and in alignment from the front to the rear of said cylinder, the opposite front and rear ends of said blades respectively being connected by a member arranged therebetween.

EMERY THOMPSON.